UNITED STATES PATENT OFFICE.

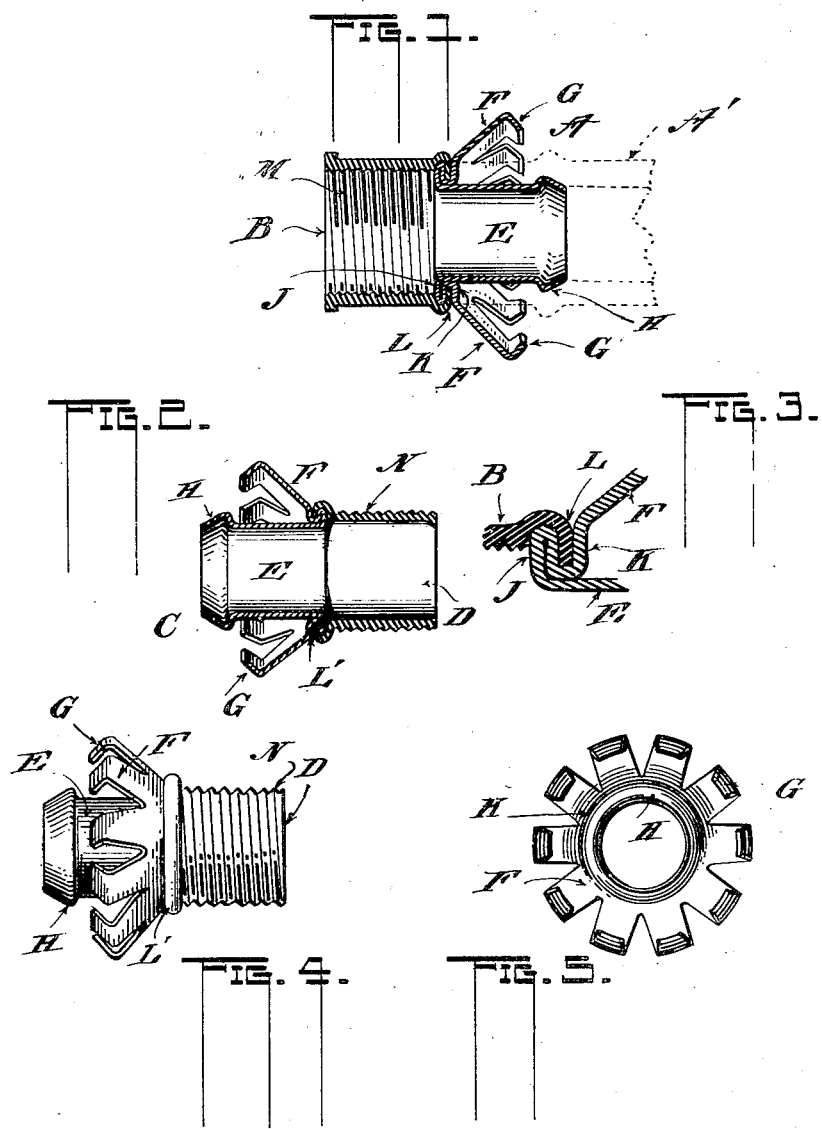

JOSEPH STUBER AND HENRY G. KUCK, OF PEORIA, ILLINOIS.

HOSE-COUPLING.

1,101,819.  Specification of Letters Patent.  Patented June 30, 1914.

Application filed February 24, 1913. Serial No. 750,245.

*To all whom it may concern:*

Be it known that we, JOSEPH STUBER and HENRY G. KUCK, citizens of the United States, residing at Peoria, in the county of Peoria and State of Illinois, have invented certain new and useful Improvements in Hose-Couplings; and we do hereby declare that the following is a full, clear, and exact description of the invention, which will enable others skilled in the art to which it appertains to make and use the same.

This invention relates to a hose coupling

One of the objects of the invention is to produce a hose coupling whose parts are formed of sheet metal in order to furnish a device that will be low in cost.

Another object is to produce a hose coupling structure in two parts of sheet metal, one of said parts adapted to receive and hold the hose, the other associated therewith adapted for attachment to a hose fitting, faucet, or other device, preferably by means of threads in the usual way, or by any other method.

Another object is to produce a hose coupling structure of two parts of sheet metal, one to have a firm and rigid connection with a hose, the other being fixed to the first part and adapted to engage a hose fitting or other desired device.

Another object is to provide a hose coupling part of sheet metal made in two portions one of said portions adapted to turn relatively to the other and adapted to receive a companion coupling-part also of two portions fixed relatively, both parts adapted for connecting the ends of hose sections.

We have described and shown in a copending application, #641,378, filed July 29, 1911, a hose connector or mender, constructed of sheet metal for permanently connecting the ends of a broken hose or the ends of two hose sections but in the present application we include a part similar to one of those parts shown in said pending application except that at the base thereof a recurved part or flange is formed to engage the flange of a second portion that is to be attached to a hose fitting, faucet, or other device, the two parts either being fixed relatively or adapted to swivel one on the other.

To the end that our invention may be fully understood we have provided the accompanying drawing, in which:

Figure 1 is a longitudinal section of a coupling composed of two parts adapted to turn upon one another. Fig. 2 is a longitudinal section of a second coupling constructed of two parts, one being fixed relatively to the other. Fig. 3 is an enlarged detail, in longitudinal section, of a recurved part of a portion of the coupling and a flange of another part to engage the same. Fig. 4 is a side elevation of the form of coupling shown in Fig. 2, and Fig. 5 shows one end of either of the couplings shown in Figs. 1 and 4 looking toward the end that is to receive the hose.

The two couplings shown, Figs. 1 and 2, comprise two portions. That in Fig. 1 consists of a part A, for grasping the loose end and a part B loosely associated with it to engage some other part or fitting. In Fig. 2 they are indicated at C and D and correspond respectively, as to the utility of the parts, with those of said Fig. 1. That is to say, each of the parts A and C of these figures consist of a tubular portion E with which is formed, integrally, a series of fingers F whose ends terminate in spurs G, preferably, all of which point in the direction of the described tubular portion. The outer end of the latter terminates in an enlargement or head H behind which, in practice, the spurs G are adapted to lie for engaging the hose A' indicated in broken lines in Fig. 1. The inner end or base of the member A terminates in an extension J of two thicknesses created by recurving upon itself that portion of the metal from which the fingers F extend, the said extension J being afterward formed into a flange the plane of which lies perpendicular to the axis of the bore of the part A. Preferably the part B is formed also of sheet metal and its end is turned inward into a flange L to engage the flange J as shown. The two flanges thus prevent separation of the parts A B or the parts C, D. In addition to the above, the part from which the said fingers F extend is turned outwardly into the flange-part K and lies substantially parallel to and incloses the flange L in a snug manner. The base of the flange-part K besides backing up the flange L forms an abutment for the end of the hose, the fingers F bending at the outer portion of said flanges when brought down upon the hose. There is little or no chance for leakage around the hose-end since the openings between the fingers terminate and are somewhat distant from the flange-part and thus practically a solid band overlies the said hose-end.

The structure described is clearly shown in Fig. 3 the parts being much enlarged to make the construction thoroughly understood. The tubular portion B may be made of tubing, but, as stated, as a matter of preference it is made of sheet metal in order to produce a coupling of low cost, but in any event after the parts have been brought into engagement as described the device is complete, suitable interior threads M having been cut or formed within said part B and exterior threads produced on the part D, and the diameter of the latter part is such as to permit its engagement with the part B.

It is to be observed while both Figs. 1 and 2 involve the same structure as regards the manner of their connection, that the parts in Fig. 1 are permitted to turn upon each other while those in Fig. 2 are fixed relatively by forcing the flanges firmly together. The relation of the parts in both figures may be reversed as to this, of course, although usually the female portion of a coupling is usually the part that is permitted to turn. The coupling being formed of sheet metal can be produced absolutely perfect by means of dies or other suitable tools and the flanges of the parts can be readily brought into engagement due to the ductility of the metal.

The form of coupling described is easily made and can be produced at a lower cost than forms of couplings involving more than two portions and there is less likelihood of trouble in the direction of leakage. And in using but two parts in the structure there are no additional parts to become loose or lost. In addition, it is to be stated that the part A may be a separate article for attachment to any part or fixture not necessarily the parts B, D. The combination shown, however, is the preferred form for hose service.

Having thus described our invention, we claim:—

1. A hose coupling consisting of a tubular portion adapted for receiving a hose and including an annular enlargement at one end over which to draw the hose, and including at its other end a radially extending portion recurved upon itself toward the said tubular portion and thence again extending radially from the latter and terminating in a series of members adapted to be bent down to overlie and engage the hose, and a coupling member having a flange at one end adapted to interengage between the recurved radially extending portion and the second described radially extending portion.

2. A hose coupling consisting of a tubular portion fashioned from a single piece of metal and adapted for receiving a hose at one end and including at its other end a radially extending portion recurved upon itself toward the said tubular portion and thence again extending radially from the latter and terminating in a series of members adapted to be bent down to overlie and engage the hose, and a coupling member having a flange at one end adapted to interengage between the recurved radially extending portion and the second described radially extending portion.

3. A hose coupling consisting of a tubular portion fashioned from a single piece of sheet metal including an annular enlargement at one end over which to draw the hose, and including at its other end an outwardly extending portion recurved upon itself toward the said tubular portion and thence again extending outwardly from the latter to form a flange spaced from said first mentioned position and extended to form a series of members adapted to be bent down to overlie and engage the hose, and a coupling member having a flange at one end extending into the space between the recurved radially extending portion and the second described radially extending portion.

4. A hose coupling consisting of a tubular portion having at one end an enlargement to receive and over which to draw the end of a hose, the other end having a radially extending portion or flange thereon, a second radially extending portion or flange spaced from the first and extended to form a series of radially extending fingers adapted to be bent down upon and to engage the hose, and a tubular member having an inturned flange engaging between the two said portions or flanges.

5. A hose coupling consisting of a tubular portion over which to draw the end of a hose, the other end having a radially extending portion or flange thereon, a second radially extending portion or flange spaced from the first and extended to form a series of radially extending fingers adapted to be bent down upon and to engage the hose, and a tubular member having an inturned flange engaging between the two said portions or flanges and adapted to turn relatively thereto.

In testimony whereof we affix our signatures, in presence of two witnesses.

JOSEPH STUBER.
HENRY G. KUCK.

Witnesses:
C. F. ALDERSSON.
F. G. MOOBERRY.